(12) United States Patent
Conley et al.

(10) Patent No.: US 7,426,271 B2
(45) Date of Patent: *Sep. 16, 2008

(54) SYSTEM AND METHOD FOR ESTABLISHING SECONDARY CHANNELS

(75) Inventors: Kenneth W. Conley, Mountain View, CA (US); Dirk Balfanz, Menlo Park, CA (US); Bryan A. Pendleton, Menlo Park, CA (US); Diana K. Smetters, San Francisco, CA (US); Glenn E. Durfee, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 776 days.

This patent is subject to a terminal disclaimer.

(21) Appl. No.: 10/424,191

(22) Filed: Apr. 25, 2003

(65) Prior Publication Data

US 2004/0215974 A1 Oct. 28, 2004

(51) Int. Cl.
*H04K 1/00* (2006.01)
*H04L 9/00* (2006.01)
(52) U.S. Cl. .................. 380/33; 380/270; 713/150; 713/168
(58) Field of Classification Search ............... 709/227; 380/33
See application file for complete search history.

(56) References Cited

U.S. PATENT DOCUMENTS

| | | | |
|---|---|---|---|
| 5,408,250 A | 4/1995 | Bier | 345/169 |
| 5,519,778 A | 5/1996 | Leighton et al. | 380/30 |
| 5,539,824 A | 7/1996 | Bjorklund et al. | 380/21 |
| 6,064,741 A | 5/2000 | Horn et al. | 380/285 |
| 6,075,860 A | 6/2000 | Ketcham | 380/25 |
| 6,105,133 A | 8/2000 | Fielder et al. | 713/169 |
| 6,243,373 B1 | 6/2001 | Turock | 370/352 |
| 6,243,772 B1 | 6/2001 | Ghori et al. | 710/68 |
| 6,317,831 B1 * | 11/2001 | King | 713/171 |
| 6,366,654 B1 | 4/2002 | Cramer et al. | 379/93.09 |

(Continued)

FOREIGN PATENT DOCUMENTS

WO    WO 99/41876    8/1999

(Continued)

OTHER PUBLICATIONS

U.S. Appl. No. 10/231,194 entitled "Apparatus and Methods for Providing Secured Communication" to Dirk Balfanz et al., filed Aug. 30, 2002.

(Continued)

*Primary Examiner*—Kimyen Vu
*Assistant Examiner*—Ponnoreay Pich
(74) *Attorney, Agent, or Firm*—Park, Vaughan & Fleming LLP (57) ABSTRACT

A method for establishing a secondary communication channel between at least two computing devices over a network medium through use of a primary channel connects a first computing device with a first telephonic unit and a second computing device with a second telephonic unit. If the two telephonic units are in communication with each other over a primary channel, and communication channels are established between the computing devices and their respective telephonic units, then the first computing device transmits its location information to the second computing device over the primary channel. A connection is then established between the second computing device and the first computing device over a secondary communication channel.

21 Claims, 7 Drawing Sheets

U.S. PATENT DOCUMENTS

| | | | | |
|---|---|---|---|---|
| 6,446,127 | B1* | 9/2002 | Schuster et al. | 709/227 |
| 6,470,447 | B1* | 10/2002 | Lambert et al. | 713/151 |
| 6,845,400 | B2* | 1/2005 | Macpherson et al. | 709/245 |
| 7,260,079 | B1* | 8/2007 | Chapman et al. | 370/338 |
| 2001/0048744 | A1 | 12/2001 | Kimura | 380/247 |
| 2001/0051973 | A1* | 12/2001 | Green et al. | 709/201 |
| 2002/0061748 | A1 | 5/2002 | Nakakita et al. | 455/435 |
| 2002/0065065 | A1 | 5/2002 | Lunsford et al. | 455/411 |
| 2002/0094087 | A1 | 7/2002 | Dellmo et al. | 380/270 |
| 2002/0147820 | A1* | 10/2002 | Yokote | 709/229 |
| 2002/0147920 | A1 | 10/2002 | Mauro | 713/200 |
| 2002/0159598 | A1 | 10/2002 | Rubenstein et al. | 380/259 |
| 2003/0014646 | A1 | 1/2003 | Buddhikot et al. | 713/184 |
| 2003/0051140 | A1 | 3/2003 | Buddhikot et al. | 713/169 |
| 2003/0078072 | A1 | 4/2003 | Serceki et al. | 455/557 |
| 2003/0081774 | A1 | 5/2003 | Lin et al. | 380/44 |
| 2003/0114981 | A1* | 6/2003 | Allen et al. | 701/213 |
| 2003/0117985 | A1 | 6/2003 | Fujii et al. | 370/338 |
| 2004/0088548 | A1 | 5/2004 | Smetters et al. | 713/175 |
| 2004/0103280 | A1 | 5/2004 | Balfanz et al. | 713/169 |

OTHER PUBLICATIONS

U.S. Appl. No. 10/656,439 entitled "Method, Apparatus, and Program Product for Securely Presenting Situation Information" to Smetters et al.

U.S. Appl. No. 10/656,551 entitled "Method, Apparatus, and Program Product for Provisioning Secure Wireless Sensors" to Smetters et al.

Asokan, N. et al.: "Key agreement in ad hoc networks", Computer Communications, Elsevier Science Publishers BV, Amsterdam, NL, vol. 23, No. 17, Nov. 1, 2000, pp. 1627-1637.

Balfanz, D. et al., "Talking To Strangers: Authentication in Ad-Hoc Wireless Networks," Xerox Palo Alto Research Center, [Retrieved from the Internet at http://www.isoc.org/isoc/conferences/ndss/02/proceedings/papers/balfan.pdf on Feb. 18, 2003] (Posted on the Internet on Feb. 11, 2002).

Bardram, Jakob E. et al. "Context-Aware User Authentication-Supporting Proximity-Based Login in Pervasive Computing", A.K. Dey et al. (Eds.): UbiComp 2003, LNCS 2864, pp. 107-123, 2003.

Dridi, F. et al., "How to Implement Web-Based Groupware Systems Based on WebDAV," Published in Proc. of WETICE 99, IEEE 8th Intl. Workshops on Enabling Technologies: Infrastructure for Collaborative Enterprises, Stanford, CA, pp. 1-7 (1999).

Fielding, R. et al., "Web-Based Development of Complex Information Products," Communications of the ACM, vol. 41, No. 8, pp. 84-92 (1998).

Kindberg, Tim and Zhang, Kan "Secure Spontaneous Device Association", A.K. Dey et al. (Eds.): UbiComps 2003, LNCS 2864, pp. 124-131, 2003.

Lopes, D. et al., "Aerial Acoustic Communication," IEEE Workshop on Applications of Signal Processing to Audio and Acoustics, pp. 21-24, (2001).

Schneier, Bruce: "Applied Cryptography: Protocols, Algorithms, and Source Code in C" 1996, John Wiley & Sons, New York, US, Section 8.3 "Transferring Keys".

Stajano, F. and Anderson, R.: "The Resurrecting Duckling: Security Issues for Ad-hoc Wireless Networks" 1999, AT&T Software Symposium, 'Online!' Sep. 15, 1999.

Whitehead, Jr., E. et al., "WebDAV, A Network Protocol for Remote Collaborative Authoring on the Web," pp. 1-21 (1999) [Retrieved from the Internet at http://citeseer.nj.nec.com/whitehead99webdav.html on Mar. 11, 2003].

Whitehead, Jr., E. et al., "Lessons from WebDAV for the Next Generation Web Infrastructure," Department of Information and Computer Science, University of California [Retrieved from the Internet at http://www.ics.uci.edu/~ejw/http-future/Whitehead/http_pos_paper.html on Sep. 20, 2002].

Daniel E. Geer, Donald T. Davis, "Token-Mediated Certification and Electronic Commerce," Second USENIX Workshop on Electronic Commerce, Oakland, California, Nov. 1996, pp. 1-10.

Phillip Hallam-Baker, ed., ACC: "Automatic Cryptographic Configuration of Embedded Devices," XML Trust Center White Paper 19th Feb. 2002, <http://research.verisign.com/Papers/ACC1.html>, pp. 1-6.

Tim Kindberg, Kan Zhang, "Validating and Securing Spontaneous Associations between Wireless Devices," Hewlett-Packard Company, 2002, pp. 1-6.

U.S. Appl. No. 10/066,699, filed Feb. 6, 2002, Dirk Balfanz, et al.

* cited by examiner

SYSTEM AND METHOD FOR ESTABLISHING SECONDARY CHANNELS

INCORPORATION BY REFERENCE

The following U.S. patent and U.S. patent application are fully incorporated herein by reference: U.S. application Ser. No. 10/066,699, filed Feb. 6, 2002, titled "Systems and Methods for Authenticating Communications in a network Medium"; and U.S. Pat. No. 6,366,654 ("Method and System for Conducting a Multimedia Phone Cell").

BACKGROUND OF THE INVENTION

This invention relates generally to the field of telecommunications. More specifically, the present invention concerns a method and system for establishing a secondary channel between computers through the use of a telephone connection.

During the course of a telephone conversation, which is carried on a low-bandwidth channel, the individuals involved in the telephone conversation may want to use their computers to share files or edit a document together over a secondary, high-speed channel. The Internet, to which both computers are likely to be connected, can provide such a channel. However, there are several difficulties in establishing such a connection between the computers.

In order for both computers to communicate, they must be able to find each other on the Internet. Although one user could read their computer's IP address to the other user over the telephone, so that the other user could enter it into their computer, this approach is not particularly user-friendly, and non-expert users may have difficulty obtaining the necessary information from their computers. Alternatively, a location service, such as those that accompany instant messaging clients, could be used, but this requires that the parties interrupt their conversation to exchange screen names. If the parties exchange instant message screen names, they will have exchanged only enough information to communicate using one specific instant messaging application, instead of other collaboration programs that they may have in common.

Software discovery and compatibility may also be a problem, for example, for those instances in which one party is on the telephone assisting another party with a computer problem. Remote desktop software would facilitate the diagnosis of the computer problem, but to use such software, the parties need to discover that they have compatible software installed, and then they need to exchange the configuration information for those services. This two-step process of discovery and exchange may be simple for common services such as e-mail and instant messaging, but services such as remote desktop software and Internet teleconferencing usually require familiarity with the software and complicated configuration information such as host servers, proxies, and ports. These steps may be a daunting task, particularly for the novice user.

Alternatively, the parties may have compatible software installed, but are not aware of this compatibility. For example, one party's video-sharing application may be able to communicate with the other party's teleconferencing software, but neither party is able to discover or exchange the necessary information for these applications to communicate.

The parties may not have a specific goal of collaboration in advance, or even be aware that their computers can communicate with each other. However, they could be informed that they both have the same game installed on their respective computers and then decide to play against each other over the Internet. By presenting the parties with a menu of possibilities, they can socialize in ways not previously planned.

Security may also be a concern, particularly if one party wants to send the other party a confidential document. In this case, it is necessary to insure that only the intended party can receive the file, and that no one can tamper with the file while it is in transit. In a preferred scenario, the computers may have certificates issued by the same certification authority, which they can send to each other. The users then compare fingerprints of the received certificates over the telephone to insure that they were not tampered with while in transit. The users then configure their respective applications to connect only to the corresponding authenticated computer, and to encrypt all data sent across the network. In a more likely scenario, one or both of the computers may not possess the necessary keys or certificates, in which case the secure interaction may not be possible.

Consequently it is desirable to be able to provide a method and system for utilizing a low-bandwidth channel, such as a telephone, to automatically discover and establish an optionally secure secondary high-speed channel for communication and also to automatically configure compatible applications to communicate with each other.

SUMMARY OF THE INVENTION

Briefly stated, and in accordance with one aspect of the present invention, there is disclosed a method for establishing a secondary communication channel between at least two computing devices over a network medium through use of a primary channel. Connections are established between a first computing device with a first telephonic unit and a second computing device with a second telephonic unit. If the two telephonic units are in communication with each other over a primary channel, and communication channels are established between the computing devices and their respective telephonic units, then the first computing device transmits its location information to the second computing device over the primary channel. A connection is then established between the second computing device and the first computing device over a secondary communication channel.

In accordance with another aspect of the invention, there is disclosed a system for establishing a secondary communication channel between at least two computing devices over a network medium utilizing a primary channel. The system includes at least two computing devices and at least two telephonic communication units, having means of communication established between the computing devices and their respective telephonic units. A primary communication channel between the telephonic units is utilized to establish a secondary communication channel between the computing devices.

In accordance with yet another aspect of the invention, an article of manufacture in the form of a computer usable medium having computer readable program code embodied in the medium causes the computer to perform method steps for establishing a secondary communication channel between at least two computing devices over a network medium utilizing a primary channel, when the program code is executed by the computer. Connections are established between the computing devices and telephonic units, with each computing device having its respective telephonic unit. When the telephonic units are in communication with each other over a primary channel, communication channels are established between the computing devices over the primary channel through the telephonic units. A first computing device then transmits location information from the first computing device to the second computing device over the primary channel. The second computing device then uses this location information to create a connection between the second computing device and the first computing device over a secondary channel.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Figure 1:
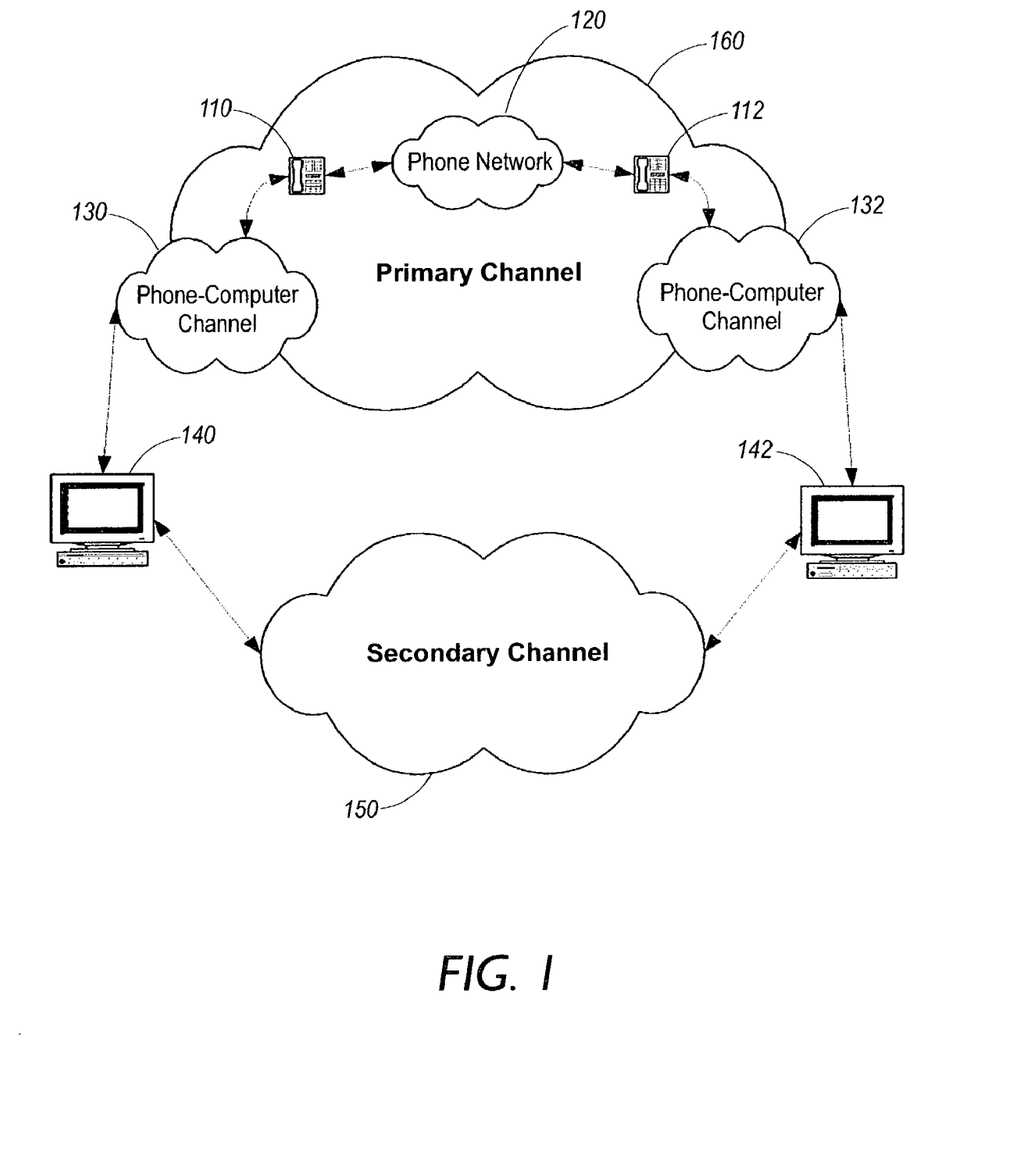
FIG. 1 illustrates one exemplary situation in which the systems and methods according to this invention may be used.

An example of a situation in which the systems and methods according to this invention may be used is illustrated in FIG. 1. Two telephones 110 and 112 are connected through the public telephone network 120, which is a slow speed channel that is relatively resistant to tampering. The public telephone network 120 provides communication channel 160 between the telephones, which can be an audio channel between the two telephones, or alternatively, could be a data channel such as Short Messaging Service (SMS), Extended Message Service (EMS), or Multi-Media Message Service (MMS), or Instant Messaging (IM). Each telephone 110 and 112 has a secure link 130 and 132, respectively, to devices 140 and 142, respectively. The secure links 130 and 132 may be accomplished by means of, for example, a Bluetooth link, an 802.11 link, a serial connection, a direct connection, or analog headset connection. Alternately, if the telephone and device are a single, integrated unit, such as a cellular phone with built-in Personal Data Assistant (PDA), the secure link may be accomplished by a direct connection. Both devices 140 and 142 are assumed to be connected to a network 150, e.g., the Internet, but do not have each other's network addresses, security credentials, etc.

If the primary channel is an audio channel, devices 140 and 142 have a communication channel established between them, since they can encode data as audio to their respective telephones 110 and 112, which is then transmitted to the other telephone and sent to the other computer, where it can be decoded. Encoding data as audio can be accomplished by means of, for example, DTMF (Dual Tone Multi Frequency), FSK (Frequency Shift Keying), or ASK (Amplitude Shift Keying). Alternately, if the primary channel 160 is a data channel such as SMS, devices 140 and 142 have a communication channel established between them, since they can send data to their respective telephones 110 and 112, which is then transmitted to the other telephone and sent to the other computer. This primary channel, however, is quite slow for the purposes of sending a large document from one device to the other. To facilitate the transmission of documents between the two devices 140 and 142, it would be preferable to establish a high-speed secondary channel between the two devices.

After the first device has connected to the primary channel, it sends a small amount of information through the primary channel. This information could, for example, include the IP address of the sender and a port on which to do a service discovery protocol. (If the secondary channel needs to be two-way authenticated, the receiving device will also have to send its information over the primary channel, as discussed more fully hereinbelow. The receiving device then uses the information to establish the secondary channel to the sender. The primary channel can also be used to make this secondary channel secure, as described hereinbelow. After establishing the secondary channel, the primary channel is no longer used by the two devices, and is fully available for person-to-person conversation.

Figure 2:
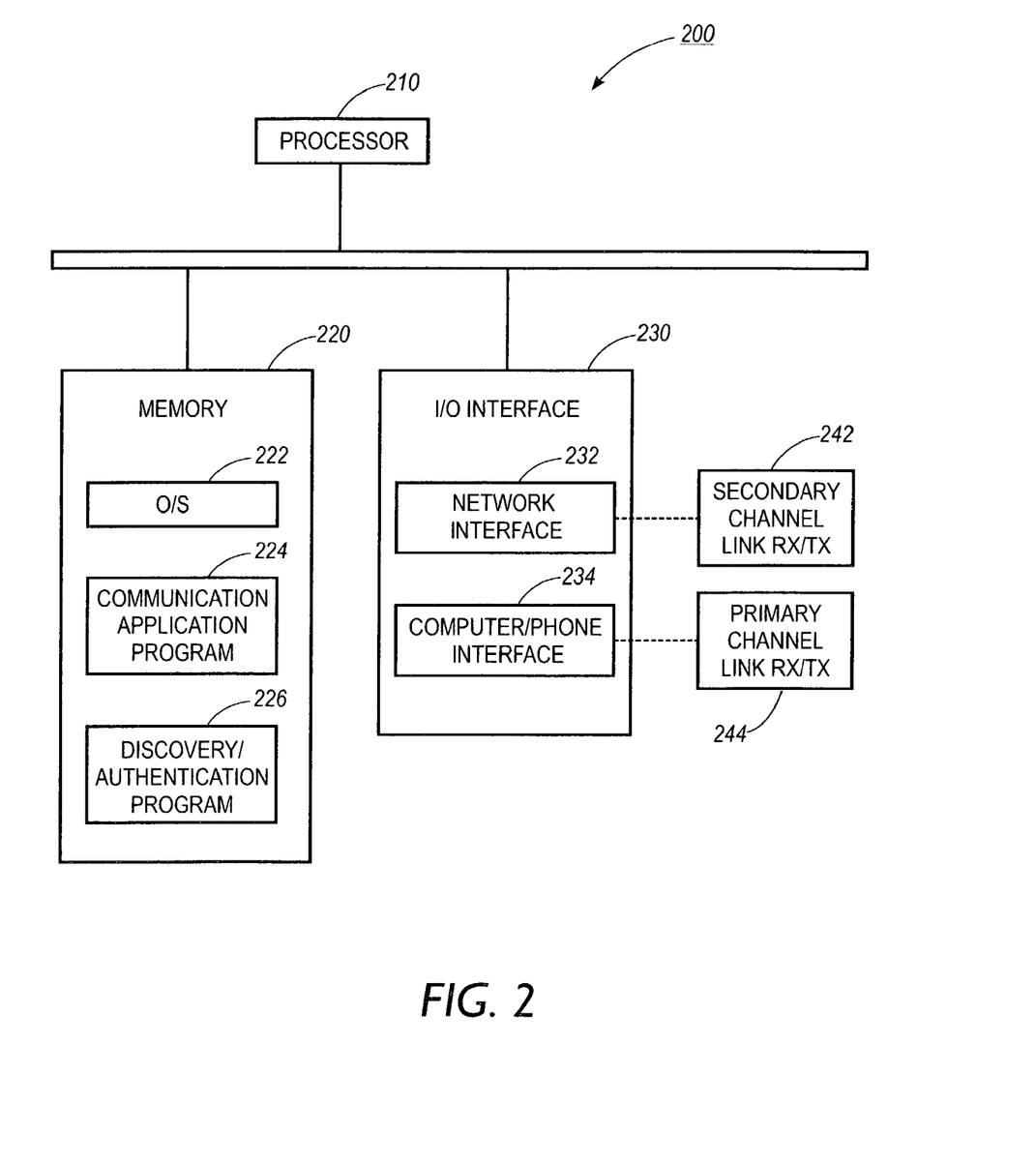
FIG. 2 illustrates one exemplary embodiment of a system for establishing secondary channels according to this invention.

FIG. 2 illustrates one exemplary embodiment of a device in a system that establishes a secondary channel in a network medium, such as the Internet. To aid in the understanding of this invention, only one device is shown. However, the system includes at least two similarly configured devices and is capable of including more than two such devices in the network to be established between the devices. The device 200 may be a laptop computer with wireless capability, a table-top computer with wireless capability, or table-top computer with wired connection, personal digital assistant (PDA) with a built-in cell telephone and Internet connectivity, a cell telephone with data service (3G), a set top box, a video-conference camera with Internet connectivity, etc. According to one exemplary embodiment, the computer device 200 includes a processor 210, a memory 220, an input/output (I/O) interface 230, a secondary channel link RX/TX 242, and a primary channel link RX/RX 244. The processor 210 may be a microprocessor, a microcontroller, a digital signal processor (DSP), an arithmetic logic unit (ALU), an application specific integrated circuit (ASIC) and the like. The memory 220 may include volatile memory and/or non-volatile memory, including one or more of random access memory (RAM), read only memory (ROM), Flash memory, a soft or a hard disk drive, an optical disk drive and the like.

The memory 220 stores an operating system 222, a communication application program 224, and a discovery/authentication program 226. The operating system 222 may be a customized basic I/O system, any known or later developed commercially available operating system or the like. The operating system 222 provides the computer instructions which, when executed by the processor 210, programs and controls various I/O controllers including the I/O interface 230 of the device 200. The operating system 222 also provides the computer instructions that store the communication application program 224 and the discovery/authentication program 226 in a retrievable manner.

The communication application program 224 provides computer instructions which, when executed by the processor 210, allows the device 200 to communicate through the primary channel link 244 connected to computer/phone interface 234 of the I/O interface 230. The computer/phone interface 234 may be Bluetooth, or as described above, an 802.11 link, an analog headset connection, a direct connection, or a serial connection. The computer/phone interface 234 may also be a direct connection if the computer and phone are a single, integrated device. Since Bluetooth capability is frequently included in cell telephones and is increasingly becoming an option for laptop computers, Bluetooth will be utilized in describing the exemplary embodiments herein, but it will be understood that other connections would also suffice. For example, the device could use aerial acoustic technology to encode a small amount of data as audio. It could then use the Bluetooth Headset Profile to send this data through its telephone to the other telephone. The computer on the other end, again using the Headset Profile, would receive the audio, and encode it back into digital data. If a robust and unobtrusive encoding is used, the users can continue to use the audio channel to communicate. The computer on the receiving end also has the option of removing or filtering the digital data to make it less noticeable to the user. Alternatively, the device could use the Bluetooth Serial Port Profile to send an SMS message containing the data. The discovery/authentication application program 226 provides computer instructions which, when executed by the processor 210, allows the device 200 to communicate through the secondary channel link 242 connected to the network interface 232 of the I/O interface 230.

The computer/phone interface 234 and the primary channel link 244 can be implemented using any known or later developed communication circuit or structure. For example, a wireless receiver transmitter and interface used in a wireless network can be used as the computer/phone interface 234 and the primary channel link 244. In an alternative embodiment, a computer device and telephone device may be a single, integrated device, thus the phone/phone interface would be implicit within the construction of the device. Furthermore, the primary channel link 244 may be implemented using any type of telephone network infrastructure, including Internet Protocol (IP) telephony, cellular, or walkie-talkies. The network interface 232 and the secondary channel link 242 can be implemented via the Internet or via any channel capable of transmitting data, such as a Bluetooth connection, Asynchronous Transmission Mode (ATM) network, another telephone line, etc. In various exemplary embodiments, the primary channel link 244 is separate from the secondary channel link 242.

Figure 3:
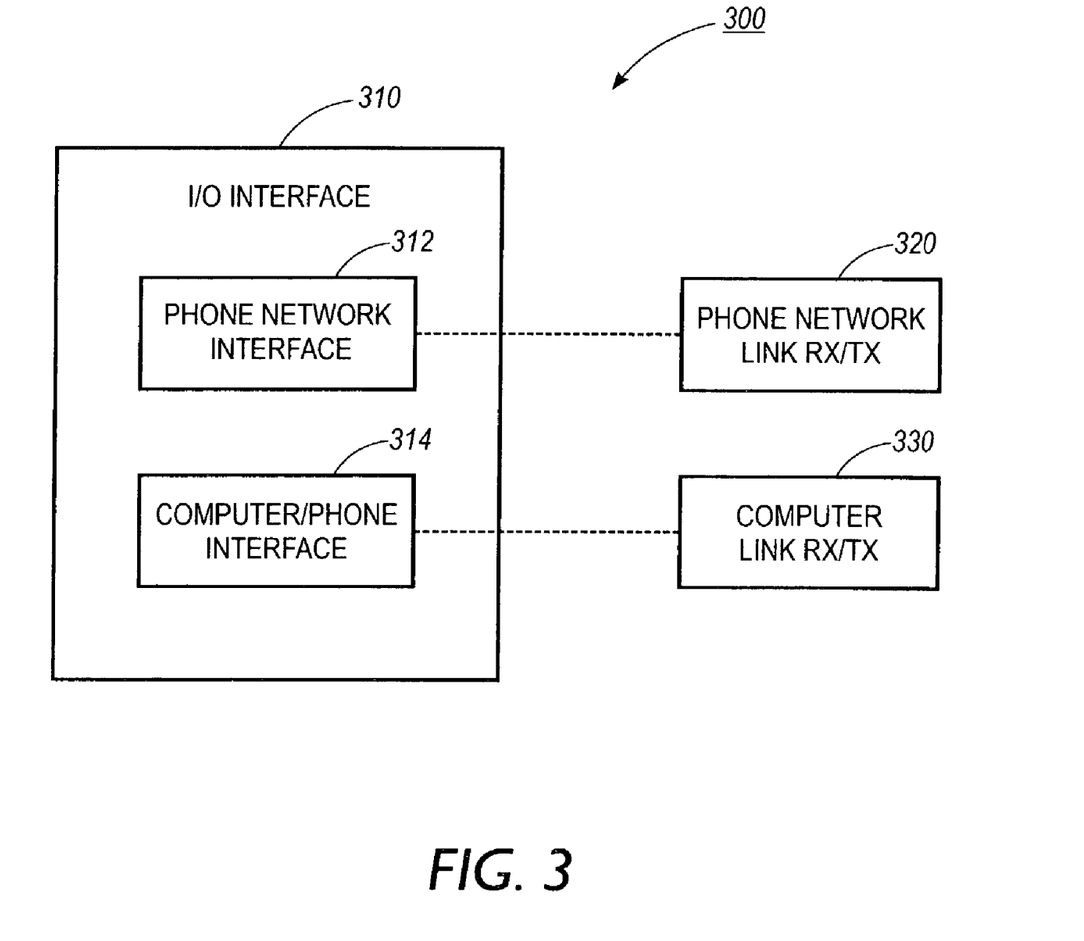
FIG. 3 illustrates one exemplary embodiment of a telephone device according to this invention.

FIG. 3 illustrates one exemplary embodiment of a receiver/transmitter 300 that receives and transmits communication over a telephone network. Only one such device 300 is shown, but it will be understood that at least two such devices are utilized for the network described herein. The device 300 includes an I/O interface 310, a telephone network link 320, and a computer link 330, as well as other optional components, such as processors, memory, operating systems, etc. I/O interface 310 includes phone network interface 312 which communicates with a phone network through phone network link 320, which communicates over whatever channel the telephone service provider establishes between the telephones on the phone network. I/O interface 310 also includes computer/phone audio interface 314, which provides the capability of communicating with a computer via computer link 330. Computer link 330 may be Bluetooth, or as described above, an 802.11 link, a serial connection, or an analog headset connection. Since Bluetooth capability is frequently included in cell telephones and is increasingly becoming an option for laptop computers, Bluetooth will be utilized in describing the exemplary embodiments herein, but it will be understood that other connections would also suffice.

Figure 4:
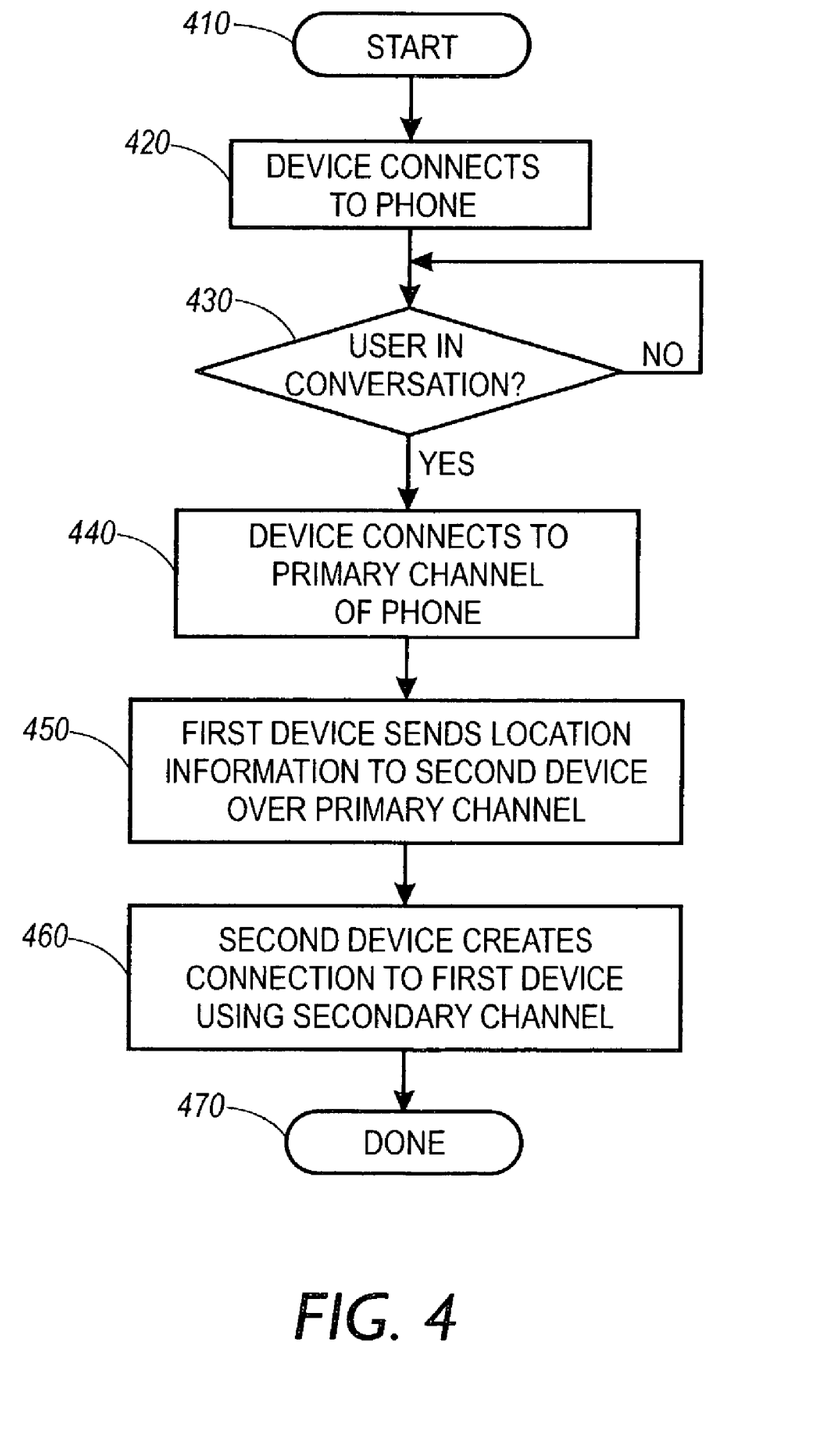
FIG. 4 is a flowchart outlining a first exemplary embodiment of a method for establishing secondary channels according to this invention utilizing one-way location information exchange.

FIG. 4 is a flowchart outlining one exemplary embodiment of a method for establishing a secondary channel through use of a primary channel. Initially a network link, for example via the Internet, is initiated at 410 by a device such as a laptop computer with wireless capability, a table-top computer with wireless capability, or table-top computer with wired connection, PDA with a built-in cell telephone and Internet connectivity, a cell telephone with data service (3G), a set top box, a video-conference camera with Internet connectivity, etc. A connection is made between the device and a telephonic unit at 420. If the users of at least two telephonic units desire to transmit data or files between their devices, for example their computers, they will need to establish communication between those devices. To accomplish this, at 430 the first device determines whether the first user is in conversation over a telephone network. If such communication is not in process, the system performs a repeating determination loop until such communication is found to be in process.

When such communication is in process, at 440 the first device connects to the primary channel of the telephone of the first user utilizing, for example, Bluetooth technology. The first device then sends a small amount of information through the primary channel, such as the location information of the first device to the second device at 450. The second device then creates a connection to the first device using a secondary channel, based on the location information of the first device at 460. At 470 both primary and secondary channels are operable simultaneously.

If the users have previously communicated with each other, the devices may not have to send location data. The Bluetooth specification allows a device to retrieve caller identification information for the current call. If the device is able to find previously stored location information about that telephone number, it can attempt to setup the secondary channel using the cached information. If the devices have changed location on the secondary network since they last communicated, the devices will have to send new location information over the primary channel in order to setup the secondary channel.

Although the preceding approach provides the desired secondary channel connection, it can also result in undesired connections from third parties, as any third party can contact the first device on the secondary channel and create a connection. It is desirable to include additional information in the primary channel that limits the ability of third parties to create connections on the secondary channel. In particular, the first device can include security information in addition to the location information it sends over the primary channel. The second device can then present this security information back to the first device over the secondary channel to affirm that it was communicating on the primary channel. This is described in more detail with reference to FIG. 5.

Figure 5:
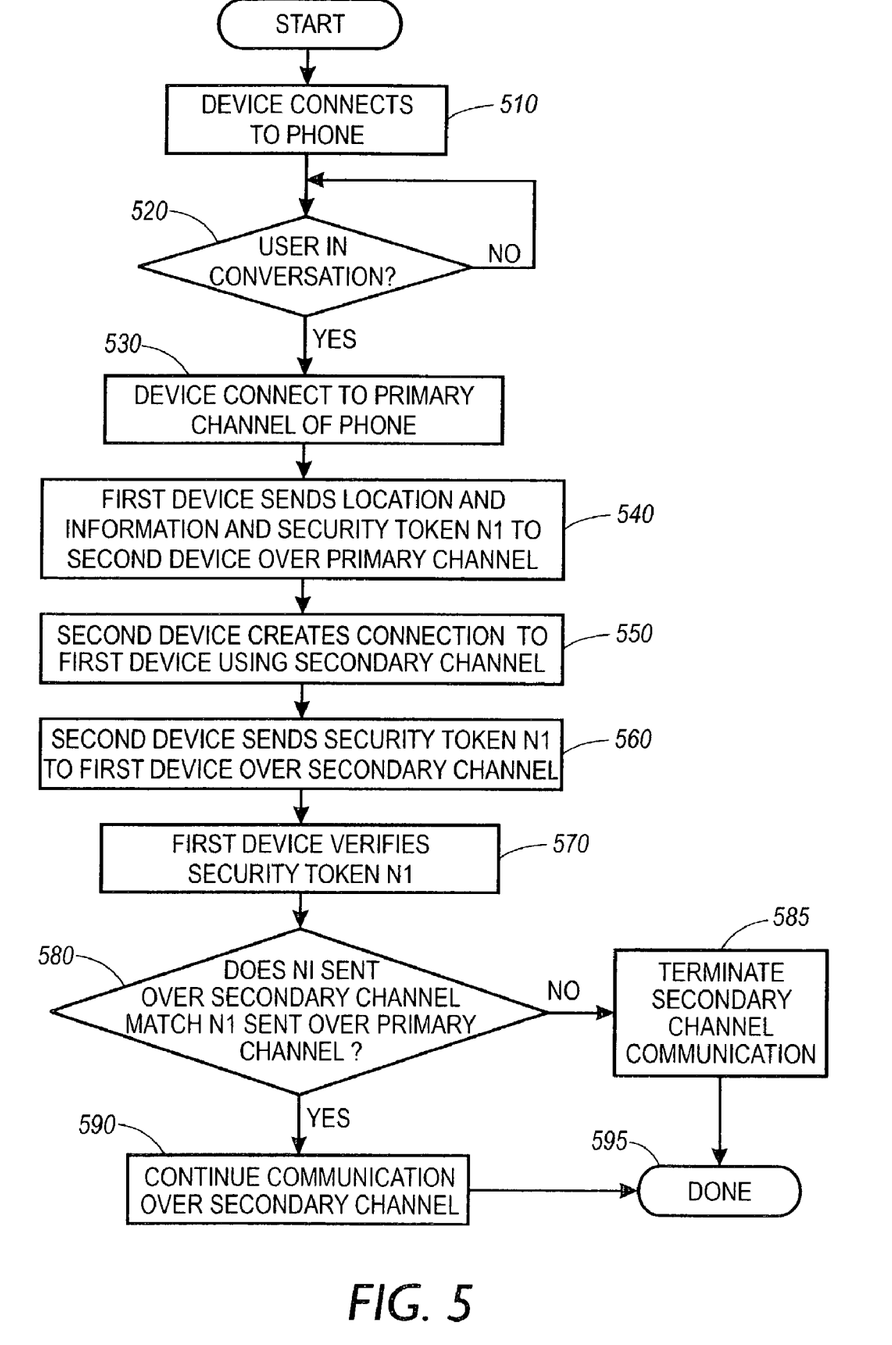
FIG. 5 is a flowchart outlining a second exemplary embodiment of a method for establishing secondary channels according to this invention utilizing one-way location and security information exchange.

In FIG. 5, a network link, for example via the Internet, is initiated by a device such as a laptop computer with wireless capability, a table-top computer with wireless capability, or table-top computer with wired connection, PDA with a built-in cell telephone and Internet connectivity, a cell telephone with data service (3G), a set top box, a video-conference camera with Internet connectivity, etc. A connection is made between the device and a telephonic unit at 510. If the users of at least two telephonic units desire to transmit data or files between their devices, for example their computers, they will need to establish communication between those devices. To accomplish this, at 520 the first device determines whether the first user is in conversation over a telephone network. If such communication is not in process, the system performs a repeating determination loop until such communication is found to be in process.

When such communication is in process, at 530 the first device connects to the audio channel of the telephone of the first user utilizing, for example, Bluetooth technology. The first device then sends a small amount of information, such as location and security token (perhaps in the form of a random number) through the primary channel to the second device at 540. The second device then creates a connection to the first device using a secondary channel, based on the location information of the first device at 550. The second device then sends its location and security information to the first device over the secondary channel at 560. The first device then verifies the security token sent by the second device at 570. When the second device makes a connection over the secondary channel to the first device, it must present this security token to verify that it was listening to the conversation. The system then determines at 580 whether the security token sent over the secondary channel matches the security token sent over the primary channel. If the tokens do not match, secondary channel communication is terminated at 585. If the tokens match, communication over the secondary channel is continued at 590 and both primary and secondary channels are operable simultaneously until communication is terminated at 595.

Figure 6:
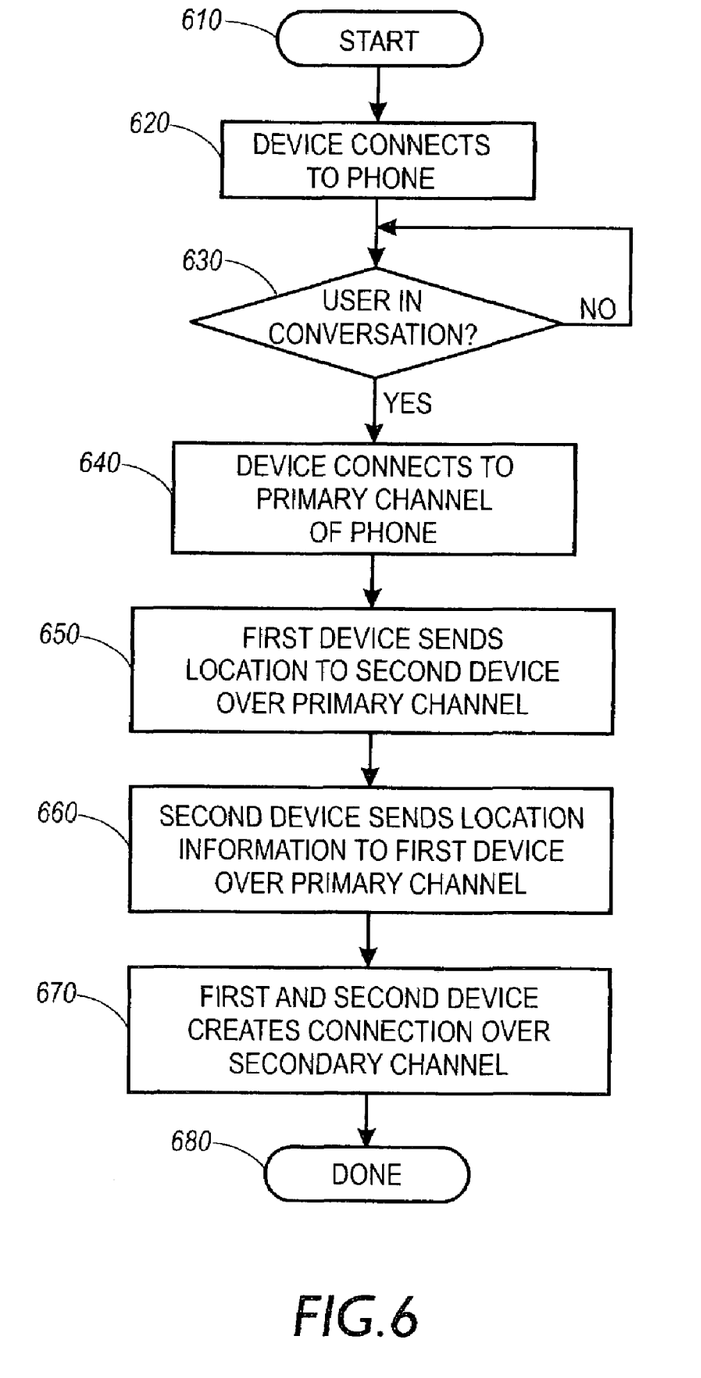
FIG. 6 is a flowchart of an exemplary embodiment of a method for establishing secondary channels according to this invention utilizing two-way location information exchange.

Turning now to FIG. 6, there is shown a flowchart outlining another exemplary embodiment of a method for establishing a secure secondary channel through use of a primary channel. Initially a network link, for example via the Internet, is initiated at 610 by a device such as a laptop computer with wireless capability, a table-top computer with wireless capability, or table-top computer with wired connection, PDA with a built-in cell telephone and Internet connectivity, a cell telephone with data service (3G), a set top box, a video-conference camera with Internet connectivity, etc. A connection is made between the device and a telephonic unit at 620. If the users of at least two telephonic units desire to transmit data or files between their devices, for example their computers, they will need to establish communication between those devices. To accomplish this, at 630 the first device determines whether the first user is in conversation over a telephone network. If such communication is not in process, the system performs a repeating determination loop until such communication is found to be in process.

When such communication is in process, at 640 the first device connects to the primary channel of the telephone of the first user utilizing, for example, Bluetooth technology. The first device then sends a small amount of information, such as location of the first device, through the primary channel to the second device at 650. The second device then sends its location information to the first device over the primary channel at 660. The first and second devices then create a connection using the secondary channel at 670, based on the exchanged location information. Communication between the devices on the secondary channel continues until terminated at 680.

If the first and second device both communicate over the primary channel, they can both include additional information to enhance the security of the secondary channel connection. Although the preceding approach described in FIG. 5 provides some security on this secondary channel, it may be vulnerable to eavesdropping by a third party, as any third party listening to the primary channel would be able to receive the security token and present it to the first device over the secondary channel. The channels between the wireless telephones and the computers are secure, since Bluetooth uses its own security mechanisms to make sure that the connection between the telephone and its computer is authenticated and encrypted. Moreover, while it may be possible to eavesdrop on a telephone communication, it is relatively difficult to inject information into an existing telephone communication. This makes the primary channel a candidate for a location-limited channel, which has the property that human operators can precisely control which devices are communicating with each other.

In particular, to establish a secure secondary channel, the first and second devices both exchange public security information over the primary channel, such as a signature of their public keys (a signature of a public key consumes less bandwidth on the primary channel). The first and second devices also exchange matching public security information, such as the full public keys, over the secondary channel which they can use to verify that the device they are communicating with over the secondary channel is indeed the device they are communicating with on the primary channel. The devices do this by comparing the public security information sent over the primary channel to the public security information sent over the secondary information. Only devices that have sent public security information over the primary channel are allowed to create connections on the security channel. Thus, eavesdroppers on the primary channel are not able to create connections on the secondary channel. Also as the security information is public, eavesdroppers on the primary channel cannot use the security information to impersonate or otherwise harm the devices. This approach is described in more detail in FIG. 7.

Figure 7:
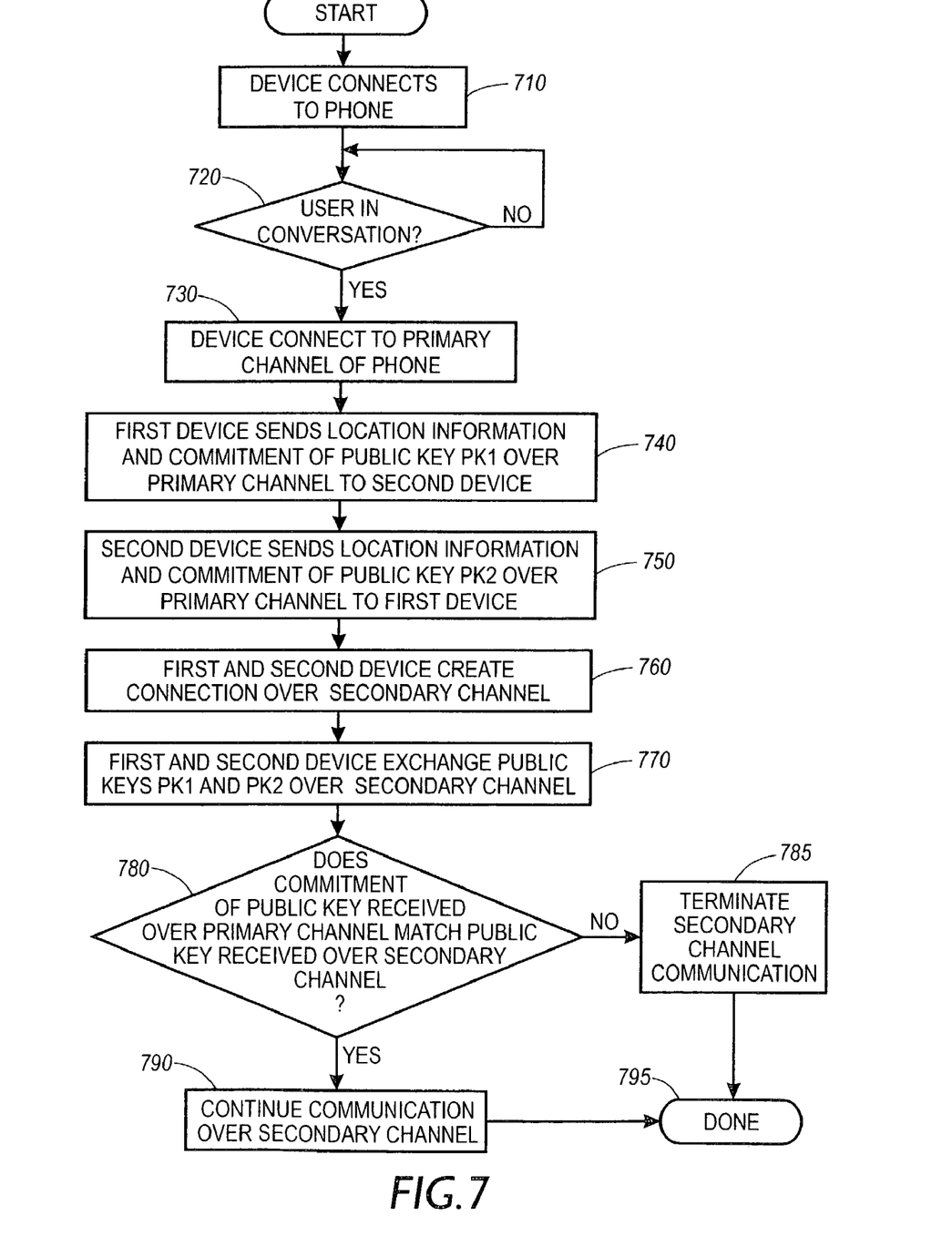
FIG. 7 is a flowchart of an exemplary embodiment of a method for establishing secondary channels according to this invention utilizing two-way location and security information exchange.

In FIG. 7 a network link, for example, via the Internet, is initiated by a device such as a laptop computer with wireless capability, a table-top computer with wireless capability, or table-top computer with wired connection, PDA with a built-in telephone and Internet connectivity, a cell telephone with data service (3G), a set top box, a video-conference camera with Internet connectivity, etc. A connection is made between the device and a telephonic unit at 710. If the users of at least two telephonic units desire to transmit data or files between their devices, for example their computers, they will need to establish communication between those devices. To accomplish this, at 720 the first device determines whether the first user is in conversation over a telephone network. If such communication is not in process, the system performs a repeating determination loop until such communication is found to be in process.

When such communication is in process, at 730 the first device connects to the audio channel of the telephone of the first user utilizing, for example, Bluetooth technology. The first device then sends a small amount of information through the primary channel, such as the location and public key commitment PK1 of the first device, over the primary channel to the second device at 740. The commitment can be the public key itself, a certificate, or a digest of the public key. Then, in response to receiving the commitment to the public key PK1 from the first device, the second device sends a commitment to the public key PK2 and location information over the primary channel to the first device at 750. At this point, additional rounds of information exchange may occur over the primary channel. The first and second devices then create a connection over the secondary channel at 760.

The two devices then exchange their public keys PK1 and PK2 via the secondary channel to create a secure connection between the devices over the secondary channel at 770. At 780 a determination is made as to whether the commitment for the public keys PK1 and PK2 received over the primary channel match the public keys received over the secondary channel. If the public key commitments received over the primary channel don't match the commitments received over the secondary channel, communication is terminated at 785. If the public key commitments received over both the primary and secondary channels match, operation continues to 790, where the first device resumes communication with the second device over the secondary link using the symmetric key agreed upon during the key exchange protocol to encrypt the communication. Operation then continues to 795, when communication is terminated.

It is noted that no common public key infrastructure is needed for this to work. In fact, both computers could generate temporary, uncertified, key pairs, and commit to those through the primary channel. Or the computers may want to exchange certificates to use in future sessions. Also, no user intervention is needed. The two computers exchange keying information (in the primary channel), and perform a key agreement protocol (in the secondary channel) automatically. This system is secure against passive attackers in the primary channel, and secure against any known attack in the secondary channel itself. If a common public key infrastructure is used, both computers may use the primary channel to simply exchange their names. However, this requires both participants to generate keys ahead of time and to publish their certificates on commonly accessible servers.

It will be appreciated that the system and method disclosed herein have numerous possible applications. For example, two computers may use the secondary channel to perform a discovery protocol on each other. In this example, one computer can advertise its IM screen names as well as the name of the teleconferencing server that is used. The other party's computer can read this information and determine whether or not it has compatible applications installed. Once compatible applications have been found, one party can be presented with a list of possible ways to communicate with the other party's computer (e.g., Setup a videophone, Share files). The other party's computer can also advertise non-configuration information, such as business vCards or personal icons.

While the present invention has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed:

1. A method for establishing a secondary communication channel between at least two computing devices over a network medium, comprising:
    connecting a first computing device with a first telephonic unit over a primary low-bandwidth channel, wherein said primary low-bandwidth channel is a location-limited channel with the following properties:
        human operators can control which devices are communicating with each other,
        transmission is physically limited,
        pre-authentication information is authentic,
        eavesdropping is possible, but information injection can be detected by communicating parties, and
        eavesdroppers on the location-limited channel are not able to create connections with the secondary communication channel;
    connecting a second computing device with a second telephonic unit;
    determining whether said first telephonic unit is in communication over said primary low-bandwidth channel with said second telephonic unit;
    transmitting a network address of said first computing device to said second computing device over said primary low-bandwidth channel, wherein the second computing device does not have knowledge of the first computing device's network address prior to the transmission; and
    creating a one-to-one secondary communication channel between said second computing device and said first computing device through the Internet.

2. The method for establishing a secondary communication channel between at least two computing devices over a network medium according to claim 1, wherein at least one of said computing devices connects to one of said first and second telephonic units utilizing Bluetooth technology.

3. The method for establishing a secondary communication channel between at least two computing devices over a network medium according to claim 1, further comprising establishing a secure connection between said first computing device and said second computing device over said secondary communication channel.

4. The method for establishing a secondary communication channel between at least two computing devices over a network medium according to claim 3, wherein establishing the secure connection comprises:
    transmitting a first security token from said first computing device to said second computing device over said primary low-bandwidth channel;
    transmitting a second security token from said second computing device to said first computing device over said secondary channel;
    verifying that said second security token sent over said secondary channel matches said first security token sent over said primary low-bandwidth channel;
    continuing communication if said first security token and said second security token are in agreement; and
    terminating communication if said first security token and said second security token are not in agreement.

5. The method for establishing a secondary communication channel between at least two computing devices over a network medium according to claim 1, wherein said secondary communication channel between said second computing device and said first computing device is created by said second computing device by utilizing the network address sent by said first computing device over said primary low-bandwidth channel.

6. The method for establishing a secondary communication channel between at least two computing devices over a network medium according to claim 1, further comprising transmitting the network address of said second computing device to said first computing device over said primary low-bandwidth channel.

7. The method for establishing a secondary communication channel between at least two computing devices over a network medium according to claim 6, wherein said secondary communication channel between said second computing device and said first computing device is created by both said first computing device and said second computing device by utilizing the network addresses sent by said first computing device and said second computing device over said primary low-bandwidth channel.

8. The method for establishing a secondary communication channel between at least two computing devices over a network medium according to claim 1, further comprising:
- transmitting a public key commitment from said first computing device over said primary low-bandwidth channel to said second computing device;
- transmitting a public key commitment from said second computing device over said primary low-bandwidth channel to said first computing device;
- transmitting a public key commitment from said f-r-era-first computing device over said secondary channel to said second computing device;
- transmitting a public key commitment from said second computing device over said secondary channel to said first computing device;
- determining whether said public key commitments received over said primary low-bandwidth channel match said public key commitments received over said secondary channel;
- continuing communication if said public key commitments received over said primary low-bandwidth channel match said public key commitments received over said secondary channel; and
- terminating communication if said public key commitments are not in agreement.

9. The method for establishing a secondary communication channel between at least two computing devices over a network medium according to claim 1, wherein said primary low-bandwidth channel comprises an audio channel.

10. The method for establishing a secondary communication channel between at least two computing devices over a network medium according to claim 1, wherein said primary low-bandwidth channel comprises a data channel.

11. The method for establishing a secondary communication channel between at least two computing devices over a network medium according to claim 1, wherein at least one of the computing devices comprises a personal digital assistant having cell phone and Internet connectivity.

12. The method for establishing a secondary communication channel between at least two computing devices over a network medium according to claim 1, wherein at least one of the computing devices comprises a table-top computer with wired connection.

13. The method for establishing a secondary communication channel between at least two computing devices over a network medium according to claim 1, wherein at least one of the computing devices comprises a video-conference camera with internet connectivity.

14. The method for establishing a secondary communication channel between at least two computing devices over a network medium according to claim 1, wherein at least one of said computing devices connects to one of said first and second telephonic units utilizing an 802.11 link.

15. The method for establishing a secondary communication channel between at least two computing devices over a network medium according to claim 1, wherein at least one of said computing devices connects to one of said first and second telephonic units utilizing an analog headset connection.

16. The method for establishing a secondary communication channel between at least two computing devices over a network medium according to claim 1, wherein at least one of said computing devices connects to one of said first and second telephonic units utilizing a serial connection.

17. The method for establishing a secondary communication channel between at least two computing devices over a network medium according to claim 1, wherein at least one of said computing devices connects to one of said first and second telephonic units utilizing aerial acoustic technology.

18. The method for establishing a secondary communication channel between at least two computing devices over a network medium according to claim 1, wherein at least one of said computing devices and at least one of said first and second telephonic units comprise a single, integrated device.

19. The method for establishing a secondary communication channel between at least two computing devices over a network medium according to claim 1, wherein not less than one of said first and second telephonic units comprises a walkie-talkie.

20. The method for establishing a secondary communication channel between at least two computing devices over a network medium according to claim 1, wherein not less than one of said first and second telephonic units comprises a cellular telephone.

21. An article of manufacture comprising a computer usable medium having computer readable program code embodied in said medium which, when said program code is executed by said computer causes said computer to perform method steps for establishing a secondary communication channel between at least two computing devices over a network medium, said method comprising:
- connecting a first computing device with a first telephonic unit over a primary low-bandwidth channel, wherein said primary low-bandwidth channel is a location-limited channel with the following properties:
  - human operators can control which devices are communicating with each other;
  - transmission is physically limited,
  - pre-authentication information is authentic,
  - eavesdropping is possible, but information injection can be detected by communicating parties, and
  - eavesdroppers on the location-limited channel are not able to create connections with the secondary communication channel;
- connecting a second computing device with a second telephonic unit;
- determining whether said first telephonic unit is in communication over a primary low-bandwidth channel with a second telephonic unit;
- transmitting the network address of said first computing device to said second computing device over said primary low-bandwidth channel, the second computing device does not have knowledge of the first computing device's network address prior to the transmission; and
- creating a one-to-one secondary communication channel between said second computing device and said first computing device through the Internet.

* * * * *